No. 716,823. Patented Dec. 23, 1902.
J. A. E. CRISWELL.
MACHINE FOR MAKING MATCHES.
(Application filed Aug. 18, 1901.)

(No Model.) 9 Sheets—Sheet 2.

Fig. 2.

WITNESSES:
William Foster
Ruth L. White

INVENTOR
J. A. E. Criswell

No. 716,823. Patented Dec. 23, 1902.
J. A. E. CRISWELL.
MACHINE FOR MAKING MATCHES.
(Application filed Aug. 13, 1901.)

(No Model.) 9 Sheets—Sheet 3.

WITNESSES: William Fork
Ruth S. White

INVENTOR J. A. E. Criswell

No. 716,823. Patented Dec. 23, 1902.
J. A. E. CRISWELL.
MACHINE FOR MAKING MATCHES.
(Application filed Aug. 13, 1901.)

(No Model.) 9 Sheets—Sheet 5.

WITNESSES: William Foster Ruth D. White

INVENTOR J. A. E. Criswell

No. 716,823. Patented Dec. 23, 1902.
J. A. E. CRISWELL.
MACHINE FOR MAKING MATCHES.
(Application filed Aug. 13, 1901.)

(No Model.) 9 Sheets—Sheet 6.

WITNESSES:
William Foster
Ruth L. White

INVENTOR
J. A. E. Criswell

No. 716,823. Patented Dec. 23, 1902.
J. A. E. CRISWELL.
MACHINE FOR MAKING MATCHES.
(Application filed Aug. 13, 1901.)

(No Model.) 9 Sheets—Sheet 7.

WITNESSES:
William Folts
Ruth L. White

INVENTOR
J. A. E. Criswell

No. 716,823. Patented Dec. 23, 1902.
J. A. E. CRISWELL.
MACHINE FOR MAKING MATCHES.
(Application filed Aug. 13, 1901.)

(No Model.) 9 Sheets—Sheet 8.

WITNESSES: INVENTOR

No. 716,823. Patented Dec. 23, 1902.
J. A. E. CRISWELL.
MACHINE FOR MAKING MATCHES.
(Application filed Aug. 13, 1901.)
(No Model.)
9 Sheets—Sheet 9.

WITNESSES:
William Foster
Ruth L. White

INVENTOR
J. A. E. Criswell

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 716,823, dated December 23, 1902.

Application filed August 13, 1901. Serial No. 71,974. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, and more particularly to machines such as disclosed in my Patent No. 656,014, dated August 14, 1900, in which the splints are cut from veneer.

The primary object of the invention is to provide simple and efficient means by which splints may be cut from strips, cards, or blanks of veneer, separated, and then forcibly inserted by the separator into the holding means or carrier in position for treatment to complete the matches.

A further object of the invention is to provide simple and efficient means by which the previously-cut splints are separated into a series of more than two independent rows in position to be discharged into the carrier.

Other objects of the invention are to provide simple and efficient means for handling the carrier-sections and to provide simple and efficient means for cutting the splints.

With these and other objects in view the invention consists in the construction and combination of the several parts, substantially as hereinafter described and then pointed out in the claims at the end of the description.

In the drawings, Fig. 95 30 is a sectional plan view showing the separator of Figs. 28 and 29 in elevation.

Figure 1:
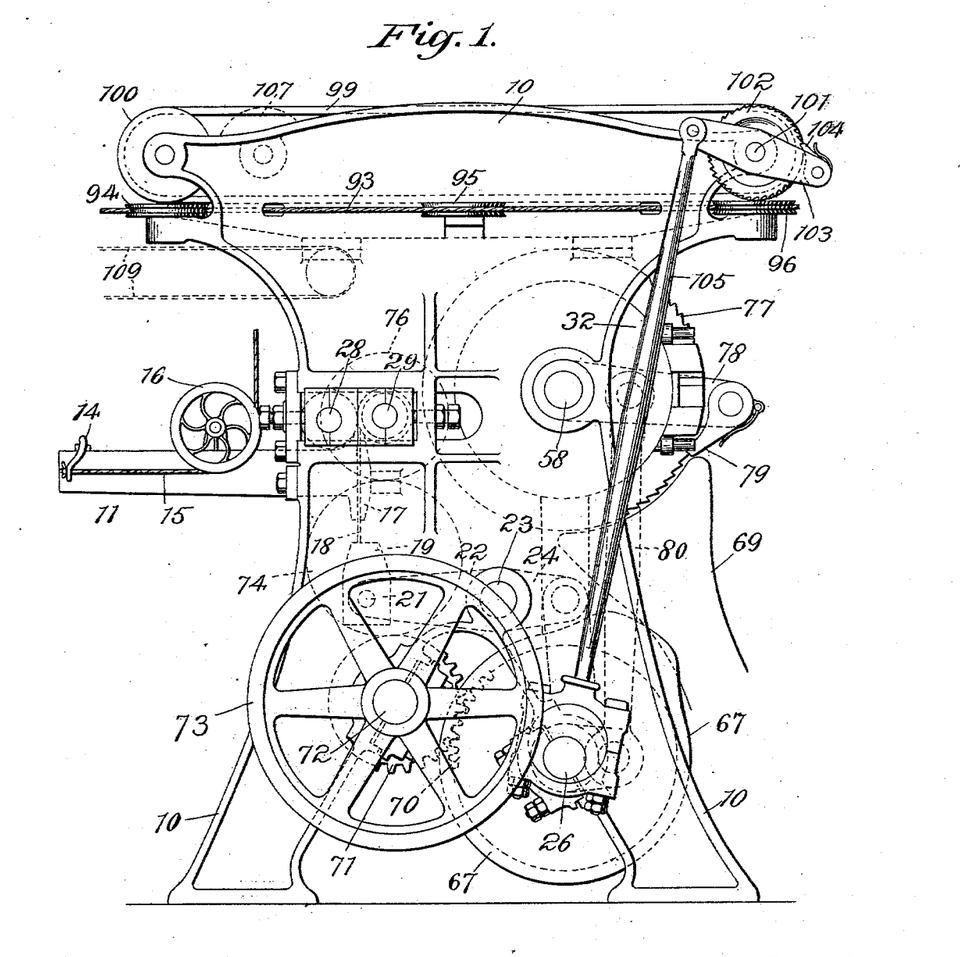
Figure 1 is a side elevation of one form of machine embodying my invention.
Figure 2:
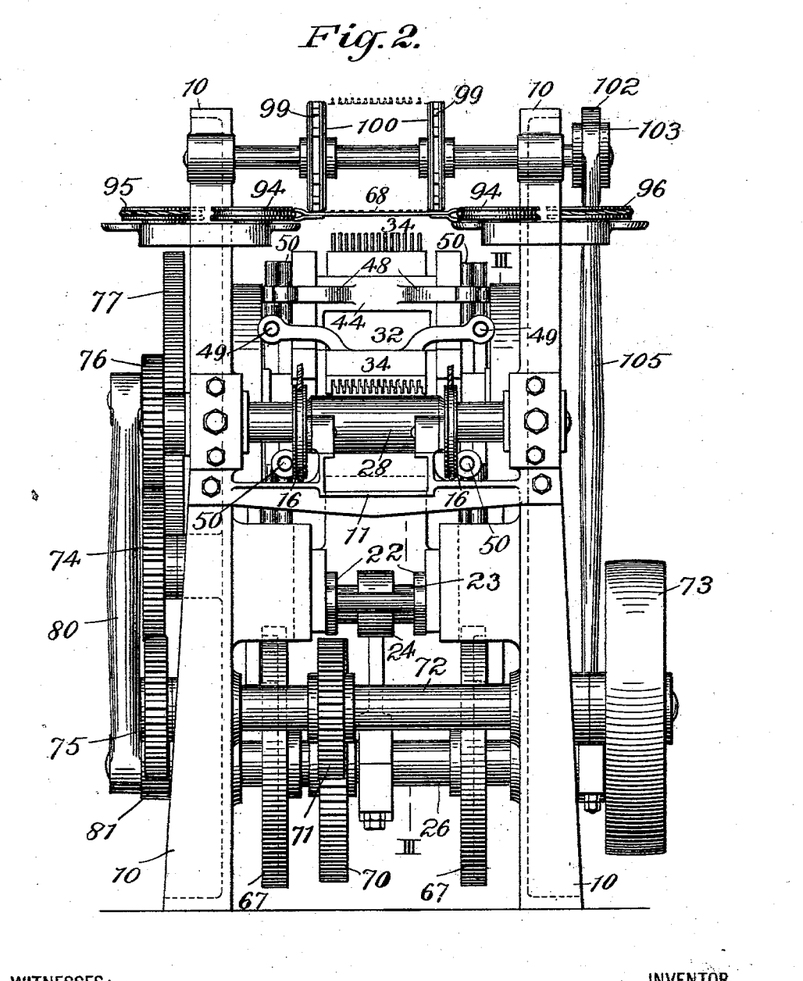
Fig. 2 is an end elevation, the follower in the card-hopper being removed.
Figures 3, 4, 5:
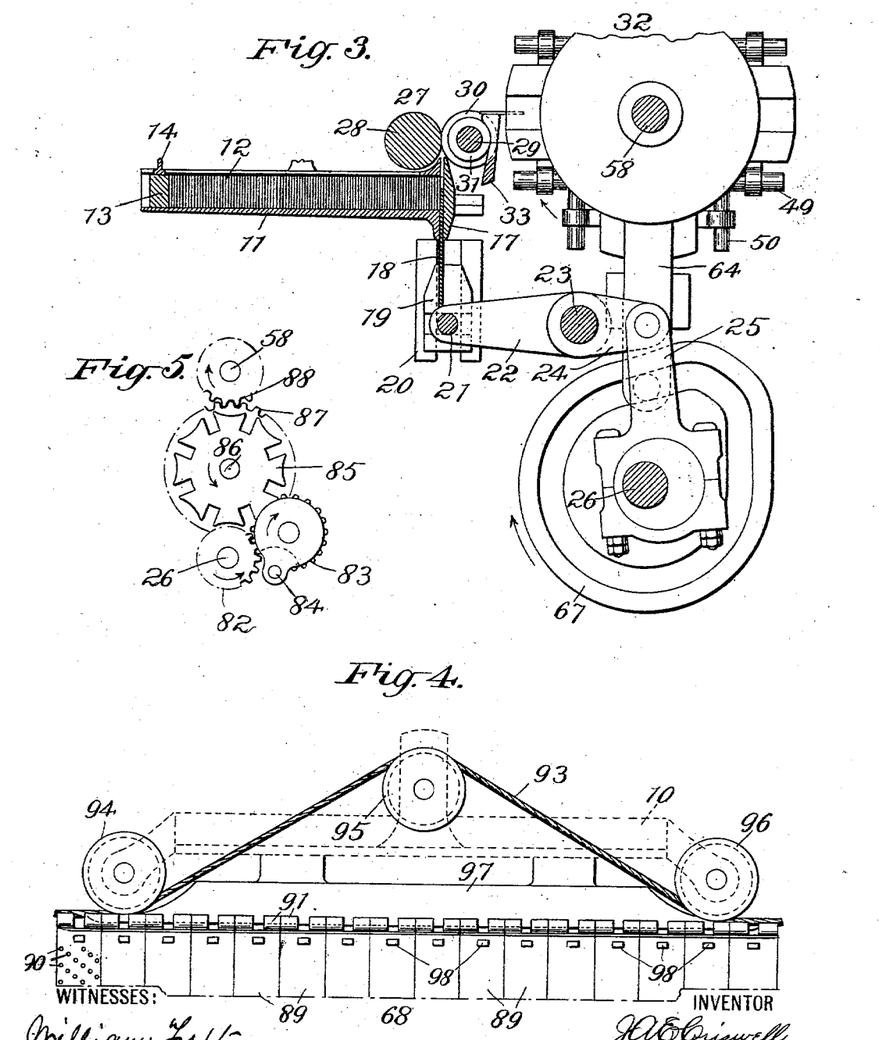
Fig. 3 is a fragmentary vertical section taken on the line III III of Fig. 2.
Fig. 4 is a fragmentary plan, partly diagrammatic, showing how the carrier plates or sections pass through the machine to receive the splints, the holding devices being shown in one only of the carrier-plates.
Fig. 5 shows one means for operating the separator-shaft.
Figures 6, 7, 8, 9:
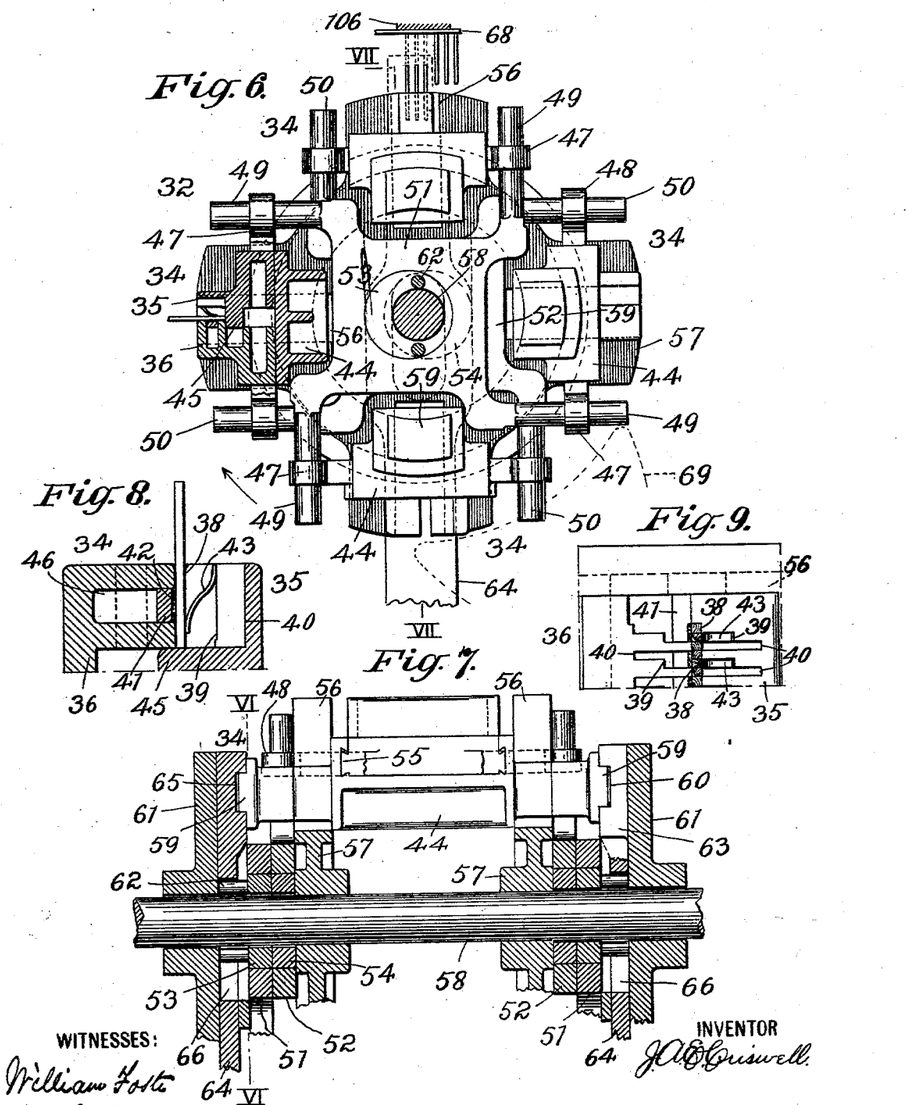
Fig. 6 is a detail vertical section of the separator, taken on the line VI VI of Fig. 7.
Fig. 7 is a fragmentary vertical section taken on the line VII VII of Fig. 6.
Fig. 8 is an enlarged fragmentary section through one of the separator members or sections.
Fig. 9 is a fragmentary plan view of Fig. 8.
Figure 10:
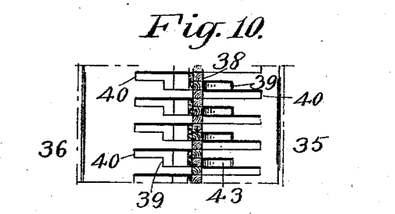
Fig. 10 is a fragmentary detail plan of one of the separator-sections, showing the splints before they are separated.
Figure 11:
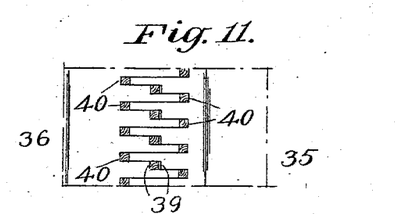
Fig. 11 is a fragmentary detail plan of one of the separator-sections, showing the splints after they are separated.
Figure 12:
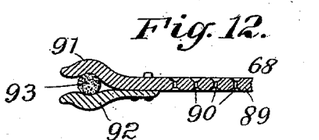
Fig. 12 is a fragmentary section of one of the carrier-plates, showing how the plates are removably held to traveling cables.
Figure 13:
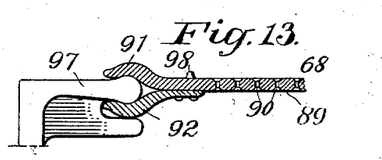
Fig. 13 is a fragmentary section of one of the carrier-plates, showing how the plates are guided while passing through the machine and how the jaws are held apart to receive the cables.

The frame 10 may be of any suitable form, and projecting outward therefrom is a hopper 11, in which are placed the cards or blanks of veneer 12. The cards are of the length and thickness of the splints and are of a width sufficient to supply a number of splints. A follower 13 is slidingly held in the hopper 11, and to the follower is secured a yoke 14. This yoke has its ends extending over and to approximately the longitudinal center of the hopper and is fastened to the ends of ropes or other flexible connections 15. The ropes 15 pass around pulleys 16, and their ends are suitably weighted or otherwise made to force the follower inward through the chute or hopper. The inward movement of the follower will force the inner card against a plate or backing 17 in the path of a plunger 18. This plunger is fastened to slides 19, which work in the guides 20. A transverse rod 21 has its ends held in slots in the slides 19, and connected to the transverse rod are arms 22, which are secured to a rock-shaft 23. The shaft has a shorter arm 24 secured thereto, and this latter arm is connected to a strap 25 of an eccentric secured to the shaft 26, so that as the latter is rotated the plunger will be reciprocated and will successively force cards to the cutting device 27 in substantially the same manner as disclosed in my Patent No. 656,014, dated August 14, 1900. The cutting device may be of any suitable form. As shown, it is substantially the same as in my patent, except that the center of the roll 28 is somewhat in advance of the center of the cutter-spindle 29 in order to more readily take the thrust direct from the cutters 30 and to permit the cutters to pass entirely through the veneer cards without coming in contact with the roll 28. The cutters are beveled from both sides and spaced apart the width of the splints by the washers 31, and as the splints are cut they will be held and carried by the cutters and forced into holding devices in a separator or carrier 32, a stripper or comb 33 being provided to prevent the splints from following the cutters too far and to serve as a guide for the splints, as best shown in Fig. 3.

To separate the splints and to cause them to enter the carrier or suitable holding devices, various means may be employed. As shown in Figs. 1 to 11, the separator or carrier 32 comprises several sections 34, each in themselves an independent separator, and though four independent sections are shown this number may vary as desired. Each section comprises two bodily movable and slidable members 35 and 36, and said members have fingers 37, which form abutments 38, 39, and 40 for the splints. The fingers of one member are adapted to intermesh and fit into and between the members of the other member, so as to form sockets for the splints, and are so positioned with respect to each other that when moved in a manner to be presently described the splints will be separated from a close and single row into a series of independent and parallel rows. In this case the splints are divided into three rows, though the number of rows into which the splints are divided may vary as desired. To the member 35 is secured a cross-bar 41, which forms a backing for the splints before the latter are divided, and said bar may be provided with a yielding surface 42, as felt or other material, to provide a surface which will yield sufficiently in case the splints vary in size. A spring 43 is held against each socket 39 of the member 35 to hold every third splint against the bar 41 in order that the splints may be properly held to prevent them from reaching the wrong sockets while being separated. As will be seen, one set or every third splint is positively held between one set of abutments 38 and the transverse bar 41. A second set will be held between the transverse bar 41 and the springs 43 of the member 35. The third set is free to move during the separation in the direction of the abutments 40, so that when the members of the sections are moved toward each other one set of splints will be carried against the abutments 40, a second set against the abutments 39, and the third set will be held against the abutments 38, thus dividing the splints into three independent and parallel rows, as shown most clearly in Fig. 11. The members 35 and 36 are independently movable in the slide or frame 44, and secured to or formed on the member 35 is a boss or rib 45, against which the inner ends of the splints are adapted to rest. This bar or rib 45 forms an abutment for the splints and is adapted to take the thrust of the latter during the sticking operation, and said bar or rib is adapted to fit into a recess or socket 46 of the member 36 when the members are forced toward each other to divide the splints into independent rows. Projecting outward from the members 35 and 36 are arms or rods 47 and 48, which are provided with eyes adapted to fit over and slide upon the arms 49 and 50 of the blocks or straps 51 and 52, respectively. The arms of the sets of blocks 51 and 52 are staggered, and the arms on the same side of the blocks are arranged at right angles to each other, and both sets of blocks and arms are similarly constructed, except that the arms 49 are made to extend on one side of the slides 44, while the arms 50 extend on the other side of the said slides. The blocks 51 move around stationary eccentrics 53, and the blocks 52 move around the oppositely-arranged stationary eccentrics 54, and when rotated, as hereinafter explained, arms 47 and 48 in moving from a horizontal to a vertical position will be forced toward each other, thereby moving the members 35 and 36 and separating the splints into a series of independent rows, as best shown in Figs. 6 to 11. The movable members 35 and 36 are slidingly held in the slides 44, as at 55, and said slides are held to move in the slots 56 of the wheels 57. These wheels are fixed to a rotary shaft 58, which is suitably journaled in the frame 10, and said wheels are cut away to form supporting-arms for the sections and to prevent interference with the arms or rods 47 and 48. The ends 59 of the frames or slides 55 extend beyond the eccentric-blocks and normally move in annular grooves 60 in the stationary disks 61, which are fastened to the frame 10, and to these disks are held the eccentrics 53 and 54, as by the rods 62. The disks 61 are each cut away or formed with a vertical groove or way 63, in which is slidingly held a bar 64. These bars are each provided with a groove or recess 65, adapted to normally register with and form a continuation of the cut-away part of the groove 63. Each bar is provided with a slot 66 to span the shaft 58 and is reciprocated by a cam 67, secured to the shaft 26. It will be seen that as the shaft 58 is rotated the wheels 57 will rotate and carry the slides 55 therewith, and the ends of said slides will move in the annular grooves 60 in the stationary disks 61 until the ends of the slide of the upper section move into the grooves 65 of the bars 64. During this quarter of a revolution the blocks 51 and 52, rotating around the eccentrics 53 and 54, respectively, will shift the two movable members 35 and 36 and will separate the splints into three independent rows, as already explained and shown in Figs. 6 to 11. As soon as the splints are separated and they are in a vertical position the cams 67 will suddenly force the bars 64 upward, so as to carry therewith the slide whose ends are in the grooves of the bars. This movement will stick the splints into the holding devices of the carrier 68, and owing to the shape of the grooves in the cams 67 and the rollers which ride in said grooves the slide will be suddenly returned, leaving the separated splints in the carrier and in position to pass from the grooves in the ends of the bars 64 and again enter the annular grooves in the disks 61, when the shaft is given another intermittent movement of one-quarter revolution. During three-quarters of each circular movement or any part thereof the separator-sections may be acted upon by any suitable means, as by an air suction, for removing fiber, dust, and the like which might remain in the separator-sections, a pipe 69, having a flared mouth and adapted to be connected to an exhaust-fan or other means, being shown for this purpose. By this means the splints are received direct from the cutters, carried and separated into independent rows to the side of and out of the plane of the cutters, and then positively forced into the holding devices of the carrier.

Any suitable timing and operating mechanism may be employed to operate the several parts. The shaft 26 has a gear 70, which is in mesh with a smaller gear 71 on the main driving-shaft 72, the latter being provided with a belt-pulley 73. An idler 74 is in mesh with the gear 75 on the shaft 72 and with the gear 76 on the cutter-spindle 29, this latter shaft being geared to the shaft of the roll 28 or not, as desired. The shaft 58 has a ratchet-wheel 77 secured thereto, and an arm 78 loosely held to the shaft. This arm carries a pawl 79, adapted to engage the teeth of the ratchet-wheel, and to the arm 78 is connected a rod 80, that is operated by a crank 81 on the shaft 72, so that at each rotation of the shaft 72 the separator-sections will be given one-quarter of their complete circular movement. Instead of this ratchet mechanism a modified Geneva movement, as in Fig. 5, might be employed. In this case the shaft 26 has a gear 82, which is in mesh with a gear 83. The shaft of this gear carries an arm on which is a stud 84, and this stud is adapted to enter slots in a wheel or disk 85, the periphery of the latter being curved between the slots and adapted to be engaged by a disk to lock the wheel during the greater part of the rotation of the shaft of the gear 83, as is usual. The shaft 86 of the slotted wheel 85 carries a gear 87, that meshes with a smaller gear 88 on the shaft 58, and the two gears are so proportioned that the shaft 58 will move one-quarter of a revolution at each revolution of the stud 84.

Figure 14:
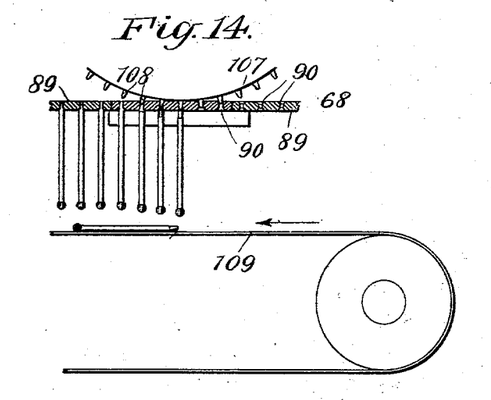
Fig. 14 is a fragmentary section showing how the completed matches are ejected from the carrier and removed from the machine.
Figure 15:
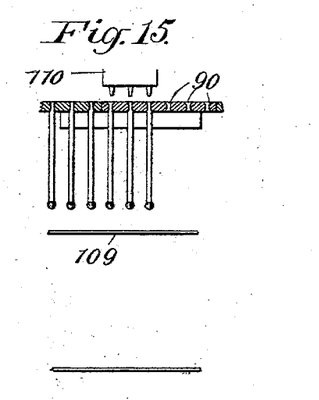
Fig. 15 shows another means for ejecting the matches.

The carrier and means for handling the carrier or the holding means for completing the matches may be of any suitable construction, and the splints and holding-sections of the carrier may be taken and the matches completed by hand, or they may be made to pass continuously through the machine and the matches completed and ejected automatically. As shown, the carrier 68 comprises a series of independent strips or plates 89, in which are the usual round holes 90, adapted to hold the splints therein in the usual manner. These holes are staggered to correspond to the position of the splints in the separator 32. Each device or plate 89 has at each end one or more fixed jaws 91 and under the fixed jaw or jaws a movable clamping-jaw 92, though it is to be understood that either or both may be movable and may be variously constructed. The lower jaw or jaws 92 is of spring material and together with the jaw 91 forms a socket for a cable or other flexible connection 93, in which the cable is normally clamped and held, though the movable jaws or jaw may be forced so as to clamp the cable or other carrying means in any desired manner. The carrier-plates enter the machine at the front, and as they do so the cables are released therefrom and pass around pulleys 94, through the openings in the frame to and around pulleys 95, in through openings in the frame again, and then around the pulleys 96 to receive and again take up the carrier-plates. The plates immediately or before they are entirely released pass on to the rails 97, secured to the frame, which latter may be of such form as will spread the jaws of the carrier-plates apart to permit the cables to enter between them more readily. Each plate has one or more teeth or projections 98 at each side which are engaged by the endless chains 99 and by which the plates now free are forced along the tables or rails 97 with a step-by-step movement, though other means than the chains may be used. The endless chains 99 pass around the pulleys 100, and on the shaft 101 of one set of pulleys is a ratchet-wheel 102. Arms 103 carry a pawl 104, which engages the teeth of the ratchet-wheel, and to the arms is connected a rod 105, which is operated by an eccentric on the shaft 26. As the eccentric is operated the ratchet-and-pawl mechanism will move the chains 99 and the carrier-plates engaged thereby with a step-by-step movement the proper distance to receive the splints from the separator, a plate 106 or other means being provided to take the thrust during the sticking of the splints. The rails 97 may be so shaped as to open the jaws at the proper time to release and to receive the cables. The carrier devices or plates after being filled with splints may be carried from the machine by the cables and the matches completed automatically, or the separate plates may be again released and the matches completed by hand. If the splints are to be paraffined, headed, &c., automatically and continuously, the plates are not again released from the cables until they return with the completed matches to the machine. In this case a roller or drum 107 (shown in dotted lines in Figs. 1 and 2 and in full lines in Fig. 14) is provided. This drum has projecting teeth or pegs 108, corresponding in position to the rows of holes in the carrier-plates, and as the plates pass under the drum the matches will be ejected therefrom. The drum 107 may be rotated by the endless chains 99 or otherwise, and as the matches are ejected they may be made to fall upon a traveling belt or apron 109, to be carried to boxing machinery, or otherwise handled, the apron being shown in dotted lines in Fig. 1 and in full lines in Fig. 14. Instead of the ejecting-drum a reciprocating plunger-head 110, as shown in Fig. 15, might be used. By having the carrier-plates removably held to the cables the latter may be moved continuously and at any desired speed without intermittently stopping the entire length of carrier, and the plates may be removed from or placed in operative connection with the cables at any desired step, and, furthermore, the slack or stretch in the cables may be readily compensated for.

The invention will be readily understood from the foregoing description when taken in connection with the accompanying drawings.

The main driving-shaft being operated and through this latter the various parts of the machine, as already explained, the cards will be forced to the cutting device 27, and after being cut they will be carried by the cutters and forced into the holding devices of the separator. A quarter of a revolution is now given the separator, and during this movement the ends 59 of the slides 44 will ride in the grooves 60 of the disks 61. As the ends of the slides 44 move in the grooves 60 the blocks 51 and 52 in moving around their respective eccentrics and through the arms 49 and 50 and rods 47 and 48 will force the two movable members 35 and 36 a sufficient distance to properly separate the splints into independent rows. The ends of the slides 44 will now rest in the grooves of the bars 64, the other ends of which are operatively connected with the grooved cams 67, and as the slides are fully engaged by the bars the cams will force said bars upward and will return them to their former position. During the upward movement of the slides the splints will be forced into the holding devices 90 of the carrier-plates 89 and said slides will be returned clear of the splints. This operation is repeated and the carrier-plates are moved each time the proper distance to place new holding devices in position to receive the splints. The cables receive the filled plates, and after the matches are completed they may be ejected by the devices referred to and removed from the machine, as hereinbefore described.

Figures 16, 17, 18:
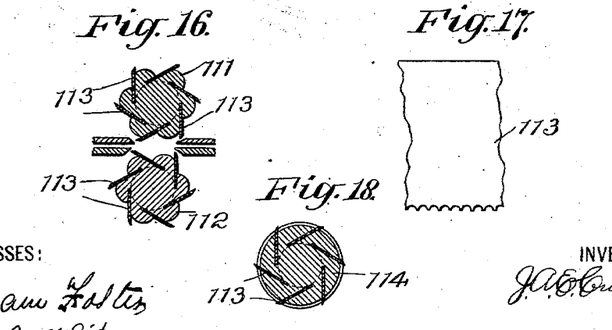
Figs. 16, 17, and 18 show means 70 for cutting round splints.
Figures 19, 20, 21, 22:
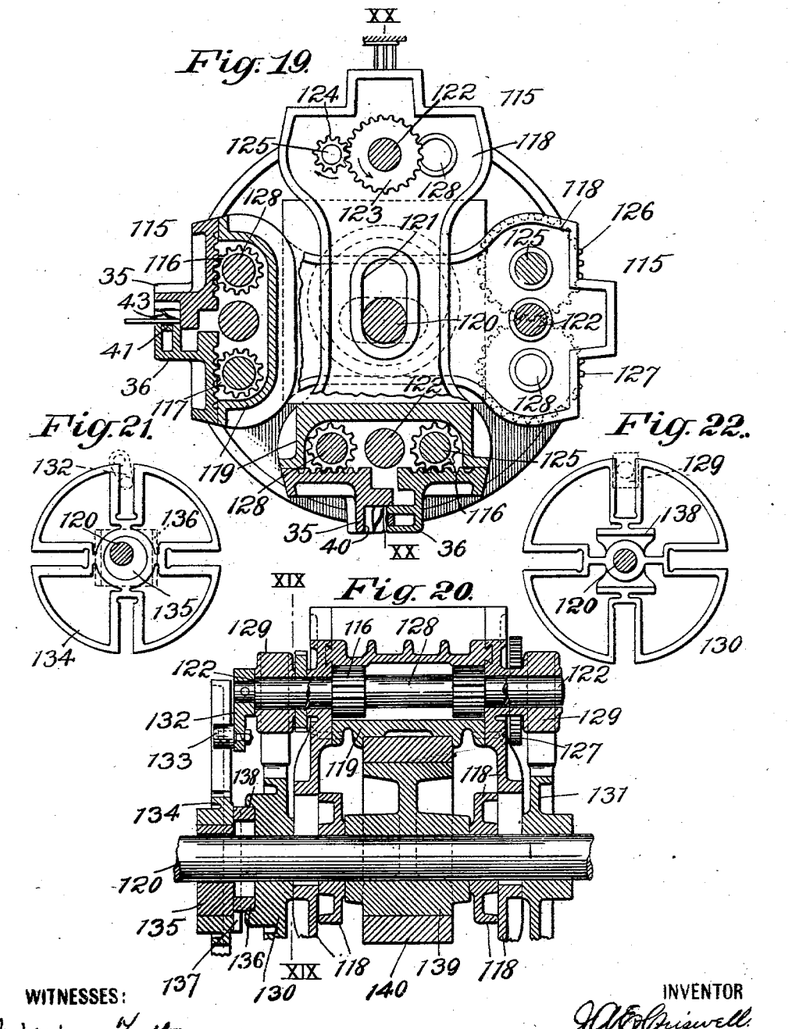
Fig. 19 is a detail sectional view of another separator, taken on the line XIX XIX of Fig. 20.
Fig. 20 is a fragmentary vertical section of the separator, taken on the line XX XX of Fig. 19.
Figs. 21 and 22 are detail views, on a smaller scale, of parts of the separator.

The cutting mechanism so far referred to cuts splints which are substantially rectangular. It is obvious that round or so-called "round" splints or other forms may be also cut and fed to the separating mechanism. In Fig. 16 is shown two rolls 111 and 112, carrying a series of knives 113. These knives are fluted, so as to score the veneer, one set of knives scoring one side of the veneer and the other set of knives the other side of the veneer, and both together cutting the veneer into splints according to the shape of the cutting edge of the knives, the veneer being fed between the cutting-rolls while the latter are rotated very fast.

In Fig. 18 the cutting-roll 114 has a continuous bearing-surface between the cutting-knives 113; otherwise it is the same as in Fig. 16.

The separator (shown in Figs. 19 to 22, inclusive) receives the splints from any suitable source and comprises a series of independent sections 115. These sections or separators each comprise two movable members similar to those shown in Figs. 6 to 9. The members 35 and 36 are provided with teeth on their lower surface and are operated by the gears 116 and 117, respectively. The movable members are slidingly held in the sections, the latter being carried by the arms 118. The arms 118 are connected together in pairs by the brackets 119 of the sections, and said brackets serve also as a support for the members 35 and 36 and as an inclosure for the sets of gears. Each pair of arms is adapted to hold or support and carry two of the sections 115. The pairs of arms are arranged at right angles to each other and span a shaft 120, and said arms are slotted, as at 121, to permit lengthwise movement of the arms for a purpose to be presently described. The shaft 122 of each section 115 has a gear 123, which meshes with a gear 124 on the shaft 125. A gear 126, also on the shaft 125, meshes with a gear 127 on the shaft 128. As the shaft 122 is rotated the gears just referred to will shift the members 35 and 36 the proper distance, and thereby separate the splints into three independent rows. The shafts 122 are provided with blocks 129, and these blocks are slidingly held in slots in the wheels or disks 130 and 131, located on opposite sides of the pairs of arms 118. The wheels are given an intermittent movement by any suitable means, which will also move the sections 115 and arms 118, said wheels being loose on the shaft 120, but so arranged as to rotate both with or independently thereof. The shafts 122 each carry an arm 132, which projects inward and has a roll 133, slidingly held in a slot in a disk 134. This disk moves around a stationary eccentric 135, fixed to one of the bearings or otherwise, and is held to rotate with the wheel 130. To permit this, a rectangular block 136 is held between the guides 137 on the disk 134 and guides 138 on the hub of the wheel 130, so as to provide a form of universal connection between said disk and wheel. An eccentric 139 is fixed to the shaft 120 and works within a rectangular block 140, each side of which is movably held against the inner surface of one of the brackets 119. The shafts 120, arms 118, and the sections 115 normally move together, and as they move the disk 134 in riding around the stationary eccentric 135 will shift the arms 118 and through the shafts 122 and gears connected therewith will operate the members 35 and 36 to separate the splints into independent parallel rows. The splints are received in a common plane and while being carried a quarter of a revolution will be fully and properly separated, as already explained, in a plane at right angles to the plane in which they are received. A full rotary movement is now given the shaft 120, and by means of the eccentric 139 the block 140 will be moved, and through this latter the arms and section containing the separated splints will be moved toward the carrier, so as to positively force or insert the separated splints into said carrier, and then will be returned free of the splints. At the same time that the section holding the separated splints is sticking the latter the section to receive the splints is being forced toward the incoming splints to receive them and again move away, the position of the parts being shown as when the shaft has made only one-half of its independent rotary movement. The shaft 120, as will be seen, is given one complete rotary movement at each one-quarter of a rotary movement of the wheels 130 and 131, and these movements may be entirely independent of each other, or the intermittent one-quarter revolution of the wheels may be so timed that it will take place at the same time as and with the last one-quarter revolution of the shaft and eccentric. The slots in the wheels and the slots in the disk 134 are in such a position during the receiving and discharging of the splints as will permit the parts fitting therein to slide without altering the position of the parts connected therewith.

The construction shown in Figs. 23 to 26 shows swinging members for separating the splints instead of sliding members, as shown in the other views. The independent sections or separators 141 each have two swinging members 142 and 143. These members are provided with ribs or fingers 144, which are curved at their inner ends, as at 145, so as to be gradually developed, and said members provide a common entering-groove 146 between them, into which the splints are initially forced and held. The members 142 and 143 are provided with shanks or studs 147, and when the members are swung on said shanks or studs as pivots toward each other the ribs or devices 144 will be caused to intermesh and will gradually separate and force the splints apart, so as to divide them into three independent rows, and during separation will carry them inward somewhat, so as to rest against an abutment and thrust-plate 148, as shown in dotted lines in Fig. 25. The studs 147 of the swinging members 142 and 143 are journaled in the slides 44, and carried by the member 143 is a pinion 149, that meshes with a larger pinion or gear 150 on the shaft 151. A second shaft 152 is journaled in each slide and is provided with a gear 153, which latter meshes with a pinion 154, carried by the member 142. The shafts 151 and 152 each are provided with arms or cranks 155. These arms have their lower ends pivoted to collars or sleeves 156, that fit over and are adapted to slide on the arms 49 and 50 of the blocks 51 and 52. It will be seen that as the blocks 51 and 52 are operated as described in connection with Figs. 6 and 7 the arm or crank 155 will rock the shafts 151 and 152 and through the gears and pinions previously referred to will swing the members 142 and 143 on their pivots toward each other, so as to properly separate the splints. The slides are then given a reciprocatory movement by the bars 64 to stick and leave the splints in the carrier, as already referred to.

Figures 23, 24, 25, 26, 27:
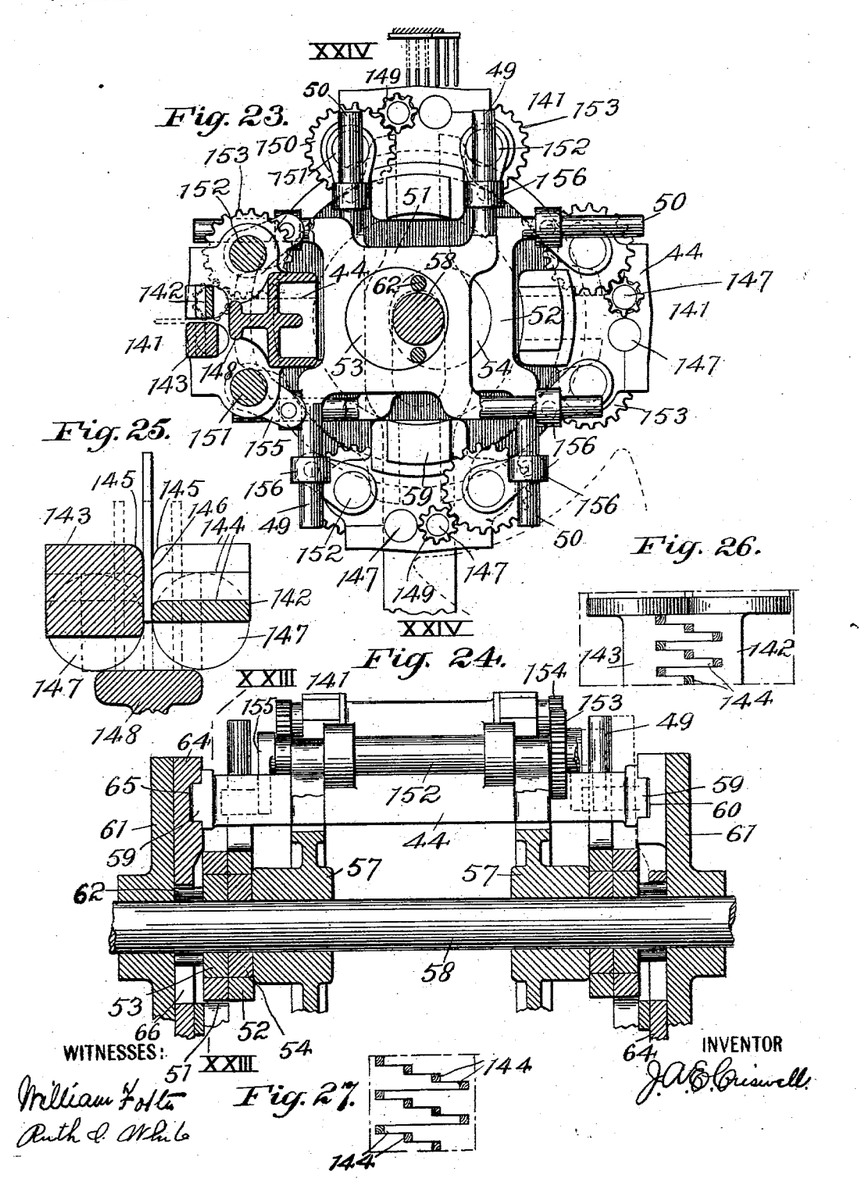
Fig. 23 is a detail sectional view of another form of separator, taken on the line XXIII XXIII of Fig. 24, showing different means for separating the splints.
Fig. 24 is a fragmentary vertical section of the separator, taken on the line XXIV XXIV of Fig. 23.
Fig. 25 is an enlarged fragmentary vertical section of one of the separator-sections, showing in full lines the position of the separator members before the splints are separated and in dotted lines after the splints are separated.
Fig. 26 is a fragmentary plan view of the separator members after the splints have been separated.
Fig. 27 shows how the splints may be divided into four independent rows.

Fig. 27 shows how the splints may be divided into four instead of three independent rows. In this structure the fingers may be made and operated as shown in Figs. 23 to 26, or the fingers may be made and operated as shown in Figs. 6 to 9, the members being operated in substantially the same manner as the members of the other views.

Figure 28:
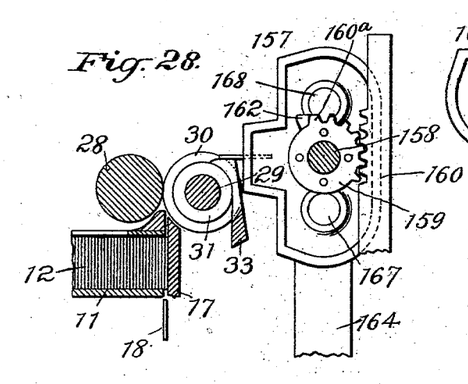
Figs. 28 and 29 are fragmentary sections, partly in elevation, showing different positions of a separator comprising a single section.
Figure 29:
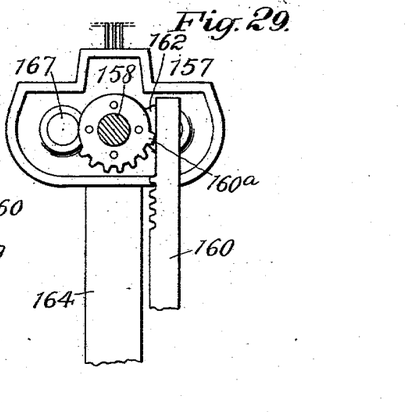
Figure 30:
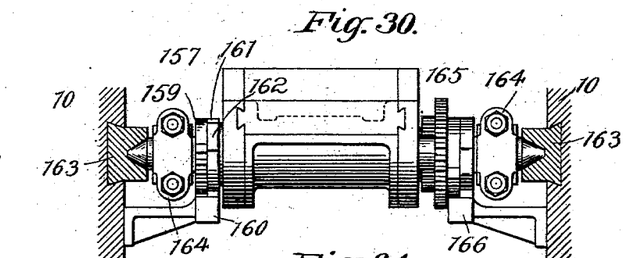

In Figs. 28 to 30 the separator consists of a single section, and the splints are held in a frame 157 and are separated by the members and rotary gear-shafts substantially as described in the preceding figures. The splints may be fed to the separator, section, or carrier as shown, which is substantially the same as in Fig. 3, though they may be cut and fed to the section in any suitable manner. Fastened to the frame 157 and movable around the shaft 158 is a segmental gear 159, the teeth of which engage a rack 160, that is held stationary on the frame. The gear 159 has a false tooth 160$^a$, and beside the gear 159 is a disk 161, which is fastened to the gear and to the frame, and said disk has a foot 162, which is adapted to rest against and slide along the straight surface of the rack 160. The shaft 158 is extended and has its outer ends rotatably held in sliding blocks 163, and said shaft and frame are moved lengthwise of the rack 160 by the connecting-rods 164. As the rods are reciprocated the separator or carrier will be rotated by the segmental gear 159 and rack 160 until the foot 162 rests on the straight portion of the rack, along which it will slide, so as to hold the separator-section in a fixed position and to force the separated splints into the carrier or other holding means, as shown in Fig. 29. On the return stroke of the rods the section will be moved free of the splints, and as soon as the tooth 160 strikes the front tooth of the rack it will cause the teeth of the gear 159 to again mesh with the rack and will restore the section to the position shown in Fig. 28, ready to again receive the splints. The splints are separated during the rotary movement of the separator. This is accomplished by arranging a form of movement substantially as described on the shaft 158 and on the opposite side of the section, as at 165. This movement works in connection with a stationary rack 166, similar to rack 160, the teeth of the gear and the rack 166 being such that it will rotate the shaft 158 the proper distance. The shafts 158, 167, and 168 are geared together, so as to move the members the proper distance, as previously described, except that all the gears connecting the shafts are placed on one side of the separator or section.

Figure 31:
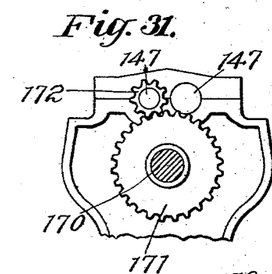
Figs. 31, 32, and 33 are fragmentary views showing the form of separator members of Figs. 23 to 26 as applied to the structure shown in Figs. 19 to 22.
Figure 32:
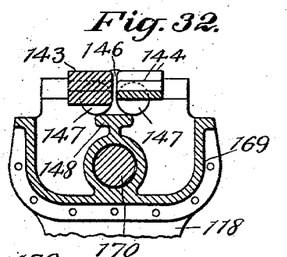
Figure 33:
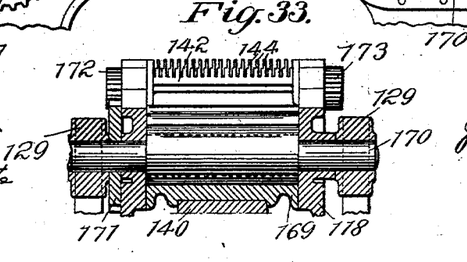

In Figs. 31 to 33 the construction of the separator members are substantially the same as in Figs. 23 to 26 and shows such separator members as applied to the separator-operating mechanism shown in Figs. 19 to 22. The arms 118 are held together by brackets 169, and journaled in the arms is a shaft 170. This shaft has a gear 171 and is operated in the manner shown in Figs. 19 and 20 or in any other suitable manner. The gear 171 is in mesh with a pinion 172, carried by the pivot of the member 143, the pivots or studs of both members being geared together by pinions 173 on one side of the arms 118. As the shaft 170 is rotated the gear 171 will operate the pinion 172 and through the gears 173 the two members will swing or move toward each other to separate the splints into independent rows. The separated splints are forced into the carrier, as previously described.

It will be understood that any of the means described for separating the splints may be applied to the structure shown in Figs. 28 to 30.

Figure 34:
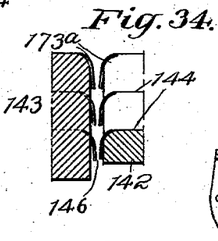
Fig. 34 shows how the splints may be initially held between the separator members by means of yielding devices.

The separator members shown in Fig. 34 are substantially the same as shown in the other views, except that spring or yielding devices 173$^a$ are provided to initially hold the splints to compensate for splints of varying thicknesses.

Figures 35, 36, 37, 38, 39, 40, 41, 42, 43:
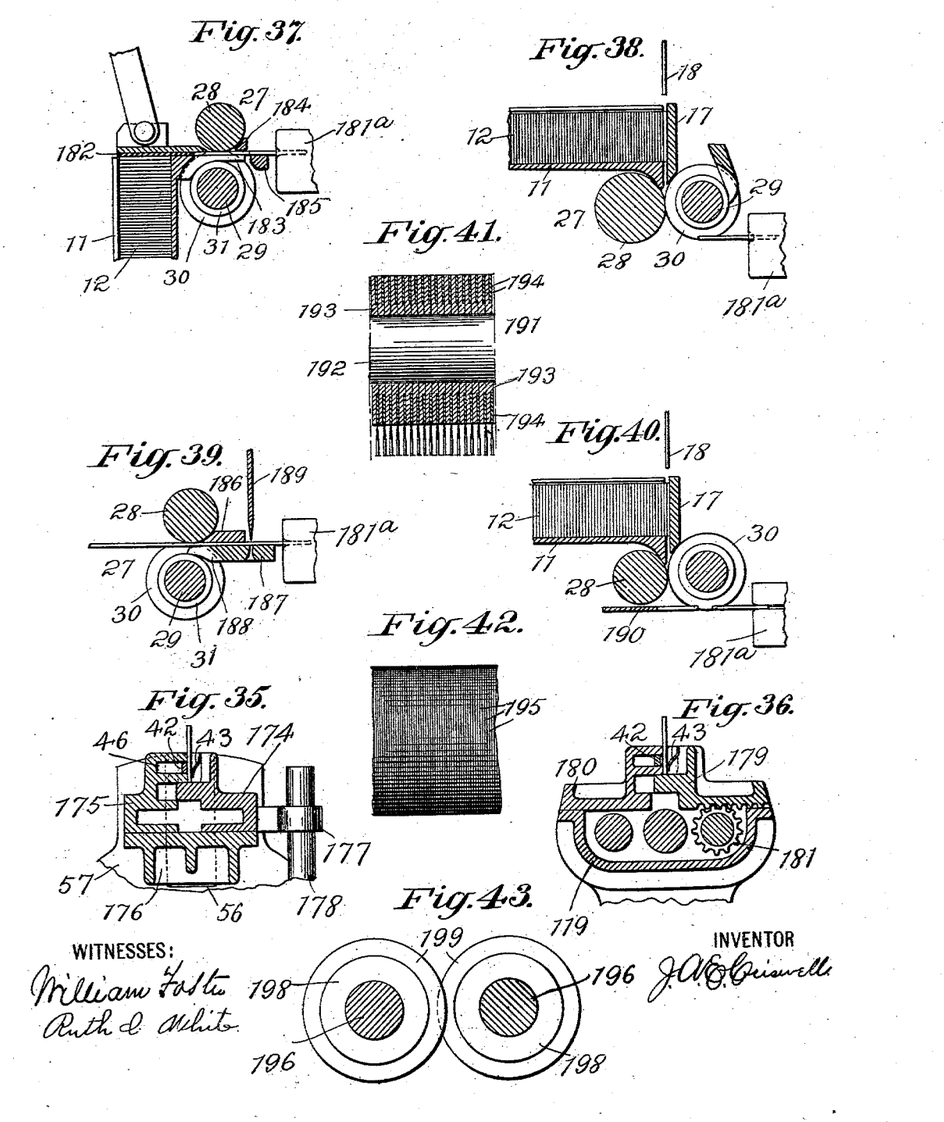
Figs. 35 and 36 are fragmentary sections showing how the splints are separated by relatively movable and stationary members.
Figs. 37 to 40 are fragmentary sections showing various means for supplying splints to the separator.
Fig. 41 is a fragmentary section through one form of backing-roll for the splint-cutters.
Fig. 42 is a fragmentary elevation of another form of backing-roll for the splint-cutters.
Fig. 43 shows a cutting device in which there are two rolls of overlapping cutters.

The separator-section shown in Fig. 35 provides relatively fixed and movable members; otherwise it is the same as in Figs. 6 to 9. In this case the member 174 is movable and the member 175 is fixed relatively to the member 174, and said fixed member is held to or formed as a part of the slide 176. The movable member only has rods 177 and operating-arms 178 of one of the sets of blocks carrying the arms. It will be seen that as the arms 178 are operated the member 174 will be forced toward the member 175 and will separate the splints into independent rows, as already described, the only difference being that the member 174 will have a greater movement than when both members are movable.

Fig. 36 shows how the members 179 and 180 may be relatively stationary or movable. The member 180 is fixed to or formed as a part of the bracket 128, and the member 179 is movable toward the member 180. This member 179 has teeth on its lower surface and is adapted to be operated at the proper time by the gear 181. The shaft of the gear 181 may be operated and the splints forced into a carrier in substantially the same manner as already described.

The cutting device shown in Fig. 37 is substantially like that already described, and instead of the splints being carried around to a plane at approximately right angles to the hopper the splints are cut by the cutters, and the plunger 132 has its end slotted to pass by said cutters and has a stroke sufficient to force the splints into the holding devices of the separator section or sections 181$^a$. Fingers 183 project from the hopper and prevent the splints following the cutters, and the guides 184 and 185 assist in guiding the splints while being forced into the holding devices of the separator-section.

Fig. 38 shows a structure similar to that shown in Figs. 3 and 37, except that the hopper is above the cutting device, while in Fig. 39 the veneer is fed in long strips or blanks. In this latter case the cutting device is similar to that already described, and as the splints are cut they pass between the guide 186 and the table 187. The guide 186 prevents the splints from following the roll 28, and the table 187 is provided with fingers 188, which enter between the cutters and strip the splints therefrom. A reciprocating or other knife 189 moves over the table 187 and cuts the splints transversely the proper length, while the ends are held in the holding devices of the separator section or sections 181ª.

In Fig. 40 the cutting device, hopper, and manner of feeding the cards or strips the proper length to the cutting device is the same as already described. The roll 28 is made somewhat smaller in diameter, and working beneath the roll is a second plunger device 190, which has its ends slotted and is so timed that it will force the splints from the cutters into the separator-section. A stripper or comb may be employed to prevent the splints from passing beyond a horizontal plane, and the separator may be placed far enough away to move the splints, after receiving them, clear of the cutters.

In Fig. 41 the roll 191 has a shaft 192, on which are preferably metallic washers 193. These washers are reduced at one side to form an annular groove, in which are held compactly paper or other washers 194. The washers 193 and 194 are held together on the shaft 192, so as to form a continuous bearing for one side of the cards, and the washers 194, of paper or cardboard, present a hard surface, yet permit the edges of the cutters to enter them to entirely sever the splints. This permits perfectly clean and smooth splints to be cut. Instead of cardboard or thin strips of paper as washers, rubber, rawhide, or other material may be employed, if desired.

In Fig. 42 the roll is made up of closely-fitting laminated sheets or washers 195, which are compact enough to form a substantially continuous surface for the splints.

Fig. 43 shows a cutting device in which there are two spindles 196. Each spindle has a series of knives or cutters 197, spaced apart the width of the splints by the washers 198, and the cutters of one spindle overlap those of the other. The cutters in this case are preferably beveled on one side only, and the straight surface of the cutters of both spindles work against each other.

It will be understood that any suitable means may be used for holding the splints and for receiving them from the separator and that the shaft 58 may be stationary instead of rotary, and the separator may then be made to move around the shaft.

The class of machinery herein shown and described is broadly claimed in my application, Serial No. 45,044, filed January 28, 1901, and the operating means for the sections and for the carrier-plates are also claimed in said application, and means substantially identical to that shown in Figs. 19 to 22 for operating the sections is claimed in my pending applications, Serial No. 56,618, filed April 6, 1901, and Serial No. 56,343, filed April 18, 1901, while the class of machine in which the section oscillates and reciprocates is claimed broadly in my applications, Serial No. 55,610, filed April 13, 1901, Serial No. 55,448, filed April 12, 1901, and Serial No. 74,347, filed September 5, 1901.

By the term "veneer" it will be understood that wood veneer or any material from which splints may be cut is included, and while a particular form of machine is shown some of the features may be used with other forms of machines.

Having thus described my invention, what I claim as new, and desire to secure by Letters Patent, is—

1. In a match-making machine, the combination with splint-cutting means, of a separator having a series of intermittently circularly moving independent sections each provided with members having fixed fingers adapted to intermesh and separate the splints into independent rows, and holding means for the splints.

2. In a match-making machine, the combination with splint-cutting means, of a separator having a series of intermittently circularly moving independent sections each having members provided with fixed fingers adapted to intermesh and separate the splints into independent rows, a carrier, and means for moving the sections out of the circle of their movement to force and leave the splints in the carrier.

3. In match-making machinery, the combination with splint-cutting means, of a separator having a series of intermittently circularly moving independent sections each provided with members having fixed fingers adapted to intermesh and separate the splints into more than two independent rows, and holding means for the splints.

4. In a match-making machine, the combination with splint-cutting means, of a separator having a series of intermittently circularly moving independent sections each having relatively fixed and movable members provided with fixed fingers adapted to intermesh and separate the splints into more than two independent rows, a carrier, and means for moving the sections out of the circle of their movement to force and leave the splints in the carrier.

5. In a match-making machine, the combination with splint-cutting means, of an intermittently-movable separator having a series of separate sections each having members provided with fixed fingers adapted to intermesh and fit into each other to separate the splints into independent rows, and holding means for the splints.

6. In a match-making machine, the combination with splint-cutting means, of an intermittently-movable separator having a series of separate sections each provided with members having fingers adapted to intermesh and fit into each other and which receive in succession a row of splints and separates the row into a series of more than two independent rows, a carrier, and means for successively moving the separate sections in a different plane and direction from that of the separating movement and toward the carrier to place the splints in said carrier.

7. In a match-making machine, the combination with splint-cutting means, of an intermittently-movable separator having a series of separate sections each provided with members having fixed fingers adapted to separate the splints into independent rows, and holding means for the splints.

8. In a match-making machine, the combination with splint-cutting means, of a series of movable sections each independent of the other and provided with members having fixed fingers which receive the splints endwise between them and separate the splints into independent rows, a carrier, and means for successively moving the sections to place and leave the splints in said carrier.

9. In a match-making machine, the combination with splint-cutting means, of a series of revoluble independent sections each having members provided with fixed fingers which are adapted to intermesh and separate the splints into independent rows, and holding means for the splints.

10. In a match-making machine, the combination with splint-cutting means, of a series of revoluble independent sections each having members provided with fixed fingers which are adapted to intermesh and separate the splints into independent rows, holding means for the splints, and means for successively reciprocating the sections to forcibly stick the splints in the holding means.

11. In a match-making machine, the combination with splint-cutting means, of a carrier, and a revoluble and reciprocatory section having members provided with fixed fingers receiving the splints endwise between them and which are adapted to intermesh and separate the splints into independent rows, and forcibly insert them into said carrier.

12. In a match-making machine, the combination with splint-cutting means, of a carrier, and a revoluble and reciprocatory section having relatively movable and stationary members receiving the splints endwise direct from the cutting means between them and which have fixed fingers adapted to intermesh and separate the splints into independent rows and which forcibly inserts the rows into said carrier.

13. In match-making machinery, the combination with means for cutting splints, of a revoluble separator-section having relatively movable and stationary members each provided with fixed fingers which receive the splints between them and separate the splints into independent rows in a direction at right angles to the plane in which they are received, a carrier, and means for reciprocating the sections to forcibly insert the splints in the carrier.

14. In a match-making machine, the combination with splint-cutting means, and means for feeding veneer to the cutting means, of a series of independent sections each provided with independent relatively fixed and stationary members having fixed fingers receiving in succession a row or line of splints endwise direct from the cutting means, and which separates the row into more than two independent rows in a plane at right angles to the plane in which they are received and held prior to separation, means for imparting a circular movement to the sections, a carrier, and means for successively reciprocating the sections to forcibly insert and leave the splints in said carrier, substantially as and for the purpose described.

15. In a match-making machine, the combination with means for supplying splints, of a separator-section provided with members having fixed fingers receiving a row or line of splints endwise and separating the row into more than two independent rows in a plane at right angles to that in which the splints are received, means for moving the separator-section, a carrier, and means for reciprocating the section toward the carrier to stick the splints in the carrier.

16. In a match-making machine, the combination with means for supplying splints, of a carrier, and a movable and reciprocatory separator-section provided with members having fixed fingers adapted to intermesh and separate the splints into independent rows and which forcibly sticks the splints into the carrier during the reciprocatory movement of said section.

17. In match-making machinery, the combination with means for supplying splints, of a carrier, and a movable and reciprocatory section having relatively fixed and stationary members, each provided with fixed fingers adapted to intermesh and separate the splints into more than two independent rows and which forcibly inserts the rows of splints into the carrier during the reciprocatory movement.

18. In a match-making machine, the combination with splint-cutting means, of a separator having a series of circularly-moving and independent sections each provided with members having fixed fingers receiving a row or line of splints endwise in succession and which separates them into independent rows when the members of the sections are moved toward each other, cross-bars carried by the sections and forming backings for the splints, means for moving the members toward each other, and holding means for the splints.

19. In a match-making machine, the combination with splint-cutting means, of a separator having a series of circularly-moving and independent sections each provided with members having fixed fingers receiving a row or line of splints endwise in succession and which separates them into independent rows when the members of the sections are moved toward each other, cross-bars carried by the sections and forming backings for the splints, means for moving the members toward each other, a carrier, together with means for successively moving the sections out of the circle of movement toward and from the carrier to place and leave the splints in said carrier.

20. In a match-making machine, the combination with means for supplying splints, of a movable and reciprocatory section having two bodily-movable members provided with fixed fingers or devices adapted to intermesh and separate the splints into independent rows, a carrier, and means for reciprocating the section to stick the splints in the carrier.

J. A. EKIN CRISWELL.

Witnesses:
R. I. WHITE,
JOHN G. PEARSE.